United States Patent
Urano

(10) Patent No.: US 8,729,736 B2
(45) Date of Patent: *May 20, 2014

(54) WIRELESS POWER FEEDER AND WIRELESS POWER TRANSMISSION SYSTEM

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 387 days.

This patent is subject to a terminal disclaimer.

(21) Appl. No.: 13/082,012

(22) Filed: Apr. 7, 2011

(65) Prior Publication Data

US 2012/0001495 A1 Jan. 5, 2012

Related U.S. Application Data

(63) Continuation-in-part of application No. 12/899,130, filed on Oct. 6, 2010.

(30) Foreign Application Priority Data

Jul. 2, 2010 (JP) ................................. 2010-151649

(51) Int. Cl.
*H01F 27/42* (2006.01)
*H01F 37/00* (2006.01)
*H01F 38/00* (2006.01)

(52) U.S. Cl.
USPC ........................................................ 307/104

(58) Field of Classification Search
USPC ........................................................ 307/104
See application file for complete search history.

(56) References Cited

U.S. PATENT DOCUMENTS

| 7,741,734 | B2 | 6/2010 | Joannopoulos et al. |
|---|---|---|---|
| 2006/0152948 | A1 | 7/2006 | Tsui et al. |
| 2007/0206968 | A1 | 9/2007 | Choi |
| 2007/0222542 | A1 | 9/2007 | Joannopoulos et al. |
| 2008/0043505 | A1 | 2/2008 | Chan et al. |
| 2008/0089099 | A1 | 4/2008 | Yang |
| 2008/0211320 | A1 | 9/2008 | Cook et al. |
| 2008/0278264 | A1 | 11/2008 | Karalis et al. |
| 2009/0015075 | A1 | 1/2009 | Cook et al. |
| 2009/0045772 | A1 | 2/2009 | Cook et al. |
| 2009/0051224 | A1 | 2/2009 | Cook et al. |
| 2009/0058189 | A1 | 3/2009 | Cook et al. |
| 2009/0072627 | A1 | 3/2009 | Cook et al. |

(Continued)

FOREIGN PATENT DOCUMENTS

| CN | 1771655 A | 5/2006 |
|---|---|---|
| CN | 101030064 A | 9/2007 |

(Continued)

OTHER PUBLICATIONS

English Translation of Chinese Office Action issued Dec. 17, 2012 for Patent Application No. 2010/10500845.9.

(Continued)

*Primary Examiner* — Carlos Amaya
(74) *Attorney, Agent, or Firm* — McDermott Will & Emery LLP

(57) ABSTRACT

Power is fed from a feeding coil L2 to a receiving coil L3 by magnetic resonance. An oscillator 202 alternately turns ON/OFF switching transistors Q1 and Q2 to cause AC current IS of drive frequency fo to flow in a transformer T2 primary coil Lb. The AC current IS causes AC current I1 to flow in an exciting coil L1 and causes AC current I2 to flow in the feeding coil L2.

13 Claims, 7 Drawing Sheets

(56) References Cited

U.S. PATENT DOCUMENTS

| | | |
|---|---|---|
| 2009/0072628 A1 | 3/2009 | Cook et al. |
| 2009/0072629 A1 | 3/2009 | Cook et al. |
| 2009/0079268 A1 | 3/2009 | Cook et al. |
| 2009/0102292 A1 | 4/2009 | Cook et al. |
| 2009/0134712 A1 | 5/2009 | Cook et al. |
| 2009/0167449 A1 | 7/2009 | Cook et al. |
| 2009/0179502 A1 | 7/2009 | Cook et al. |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0224608 A1 | 9/2009 | Cook et al. |
| 2009/0224609 A1 | 9/2009 | Cook et al. |
| 2009/0224856 A1 | 9/2009 | Karalis et al. |
| 2009/0243397 A1 | 10/2009 | Cook et al. |
| 2009/0267709 A1 | 10/2009 | Joannopoulos et al. |
| 2009/0267710 A1 | 10/2009 | Joannopoulos et al. |
| 2009/0273242 A1 | 11/2009 | Cook |
| 2009/0284083 A1 | 11/2009 | Karalis et al. |
| 2010/0038970 A1 | 2/2010 | Cook et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0225271 A1 | 9/2010 | Oyobe et al. |
| 2011/0049997 A1 | 3/2011 | Urano |
| 2011/0285211 A1 | 11/2011 | Endo et al. |

FOREIGN PATENT DOCUMENTS

| | | |
|---|---|---|
| CN | 101166389 A | 4/2008 |
| JP | 2006-230032 | 8/2006 |
| JP | 2009-106136 A | 5/2009 |
| JP | 2011-083178 A | 4/2011 |
| WO | WO 2006/022365 A1 | 3/2006 |
| WO | 2009/009559 A1 | 1/2009 |
| WO | 2009/065099 A2 | 5/2009 |

OTHER PUBLICATIONS

English translation of Chinese Search Report issued in International Application CN/2010/10500845.9 dated Sep. 30, 2010.

English Translation of Chinese Office Action issued in Application No. 201010500845.9 dated Jul. 17, 2013.

Dong, Wenhui, "Study on a Novel Double-Transistor Ultrahigh Frequency Induction Heating Circuit Topology" Database of the Whole Texts of Chinese Excellent Dissertations of Master's Degrees, Aug. 2006 (concse explanation can be found in the Chinese Office Action).

U.S. Notice of Allowance issued in U.S. Appl. No. 12/899,130 dated Aug. 14, 2013.

European Search Report issued in European Patent Application No. 10 013 386.7 dated Feb. 20, 2014.

WIRELESS POWER FEEDER AND WIRELESS POWER TRANSMISSION SYSTEM

RELATED APPLICATIONS

This application is a Continuation-In-Part (CIP) of U.S. application Ser. No. 12/899,130, filed Oct. 6, 2010 claiming priority of Japanese Application No. 2010-151649, filed Jul. 2, 2010. The entire contents of each of the foregoing applications are hereby incorporated by reference.

BACKGROUND OF THE INVENTION

1. Field of the Invention

The present invention relates to a wireless power feeder for feeding power by wireless and a wireless power transmission system.

2. Description of Related Art

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range of several centimeters. The type (B) utilizing radio wave is available in a long range; however, it cannot feed big electric power. The type (C) utilizing resonance phenomenon is a comparatively new technique and is of particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. The wireless configuration allows a completely insulated system to be achieved, which is especially effective for power feeding in the rain. Hereinafter, the type (C) is referred to as "magnetic field resonance type".

The magnetic field resonance type is based on a theory published by Massachusetts Institute of Technology in 2006 (refer to Patent Document 1). In Patent Document 1, four coils are prepared. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The distance (intermediate distance) between the feeding coil and receiving coil is larger than the distance between the exciting coil and feeding coil and distance between the receiving coil and loading coil. This system aims to feed power from the feeding coil to receiving coil.

When AC power is fed to the exciting coil, current also flows in the feeding coil according to the principle of electromagnetic induction. When the feeding coil generates a magnetic field to cause the feeding coil and receiving coil to magnetically resonate, large current flows in the receiving coil. At this time, current also flows in the loading coil according to the principle of electromagnetic induction, and power is taken out from a load R connected in series to the loading coil. By utilizing the magnetic field resonance phenomenon, high power transmission efficiency can be achieved even if the feeding coil and receiving coil are largely spaced from each other.

CITATION LIST

Patent Document

[Patent Document 1] U.S. Pat. Appln. Publication No. 2008/0278264
[Patent Document 2] Jpn. Pat. Appln. Laid-Open Publication No. 2006-230032
[Patent Document 3] International Publication Pamphlet No. WO2006/022365
[Patent Document 4] U.S. Pat. Appln. Publication No. 2009/0072629

In a circuit of Patent Document 2 (FIG. 1), when MOSFETs Q1 and Q4 are ON state and MOSFETs Q2 and Q3 are OFF state, voltage of DC power supply V1 is applied to a series circuit composed of four elements: MOSFET Q1, primary coil L1, capacitor C1, and MOSFET Q4. A series circuit of the primary coil L1 and capacitor C1 constitutes a primary side series resonance circuit (refer to paragraph [0030] of Patent Document 2), so that the impedance thereof is low. As a result, most of the voltage of the DC power supply V1 is applied to two MOSFETs. Application of excessively high voltage to the MOSFET may destroy the MOSFET, so that it is not appropriate to use a high voltage supply as the DC power supply V1. In the case of Patent Document 2, the power supply voltage of the DC power supply V1 is set to 5 (V).

In the case where a commercial power supply is used as an input power supply for wireless power feeding, it is necessary to prevent high voltage from being applied to a switching element such as MOSFET. There can be considered a method of using an AC adapter to reduce a commercial power supply voltage as one method for preventing high voltage from being applied to a switching element. However, the use of the AC adapter is undesirable because it may cause power loss or an increase in cost.

Further, the commercial power supply voltage differs from one country or region to another (For example, 100 (V) in Japan and Taiwan, 120 (V) in United States, 110 (V) or 220 (V) in China, and 115 (V) to 240 (V) in India). Thus, a system capable of meeting the difference in the commercial power supply voltage is desirable.

SUMMARY

The present invention has been made based on the above problems, and a main object thereof is to achieve wireless power feeding of a magnetic field resonance type capable of being operated safely even in the case where high voltage is input.

A wireless power feeder according to a first aspect of the present invention feeds power from a feeding coil to a receiving coil by wireless using a magnetic field resonance phenomenon between the feeding coil and receiving coil. The wireless power feeder includes a power transmission control circuit, a feeding coil, and an exciting circuit. The power transmission control circuit makes first and second switches connected in series respectively to first and second current paths alternately conductive to feed AC power to a first coil included in both the first and second current paths. The exciting circuit is a circuit in which a second coil magnetically coupled to the first coil and an exciting coil magnetically coupled to the feeding coil are connected. The exciting circuit receives AC power from the power transmission control circuit through the second coil and feeds the AC power to the feeding coil through the exciting coil.

A wireless power feeder according to a second aspect of the present invention feeds power from a feeding coil to a receiving coil by wireless using a magnetic field resonance phenomenon between the feeding coil and receiving coil. The wireless power feeder includes: a power transmission control circuit that includes first and second current paths and makes first and second switches connected in series respectively to the first and second current paths alternately conductive to feed AC power to a first coil included in both the first and second current paths; and a feeding coil circuit in which the feeding coil and a second coil are connected. The feeding coil circuit receives AC power from the power transmission control circuit through the second coil magnetically coupled to the first coil.

By making current to alternately flow in the first coil bi-directionally, AC power can be fed from the first coil of the power transmission control circuit to second coil of the exciting circuit or feeding coil circuit. This configuration eliminates the need to provide a resonance circuit in the power transmission control circuit itself, thus eliminating the need to connect a capacitor in series to the first coil. This makes it easy to apply high voltage to the first coil, facilitating suppression of voltage to be applied to a switch such as a MOSFET. Further, by adjusting the ratio of the number of windings between the first and second coils, the magnitude of voltage to be fed to the second coil can be adjusted.

The power transmission control circuit may include: a bridge rectification circuit in which diodes are bridge-connected at four first to fourth connection points; an AC power supply connected between the first and second connection points of the bridge rectification circuit; and a capacitor connected between the third and fourth connection points of the bridge rectification circuit and charged by the AC power supply and feed AC power to the first coil using the capacitor as a DC voltage source.

Rectifying AC voltage in the rectification circuit allows the capacitor to be charged by an AC power supply. By using the capacitor as a DC voltage source, it is possible to make the most of the power supply voltage of the AC power supply. This facilitates setting of high input voltage.

Two capacitors may be connected in series between the third and fourth connection points, and midpoint of the two capacitors may be connected to one of the first and second connection points. In this case, the two capacitors can easily be charged by the maximum voltage value of the AC power supply, allowing the input voltage to be set much higher. Further, a switch for controlling electrical conduction of a path extending from the midpoint to one of the first and second connection points may be provided.

The number of windings of the first coil may be greater than that of the second coil. In this case, the value of the voltage to be fed to the exciting circuit and the like can be reduced to an appropriate level even if the input voltage is high.

The input voltage of the power transmission control circuit may be applied to one of a series circuit composed of the first coil and first switch and a series circuit composed of the first coil and second switch. Setting the inductance of the first coil to a large value easily prevents excessive voltage from being applied to the first or second switch.

The power transmission control circuit may make the feeding coil that does not substantially resonate with circuit elements on the power feeding side feed the AC power to the receiving coil. The "substantially does not resonate" mentioned here means that the resonance of the feeding coil is not essential for the wireless power feeding, but does not mean that even an accidental resonance of the feeding coil with some circuit element is eliminated. A configuration may be possible in which the feeding coil does not form, together with power feeding side circuit elements, a resonance circuit that resonates with at a resonance point corresponding to the resonance frequency of the receiving coil. Further, a configuration may be possible in which no capacitor is inserted in series or in parallel to the feeding coil.

The feeding coil may be connected to a capacitor and form a circuit which resonates at a resonance frequency of the receiving coil.

A wireless power transmission system according to the present invention includes: the wireless power feeder described above, a receiving coil; and a loading coil that is magnetically coupled to the receiving coil and receives power that the receiving coil has received from a feeding coil.

The receiving coil may be connected to a capacitor and form a circuit which resonates at a resonance frequency of the feeding coil.

It is to be noted that any arbitrary combination of the above-described structural components and expressions changed between a method, an apparatus, a system, etc. are all effective as and encompassed by the present embodiments.

According to the present invention, even in the case where high voltage is input, wireless power feeding of a magnetic field resonance type can be performed safely.

BRIEF DESCRIPTION OF THE DRAWINGS

The above features and advantages of the present invention will be more apparent from the following description of certain preferred embodiment taken in conjunction with the accompanying drawings, in which.

DETAILED DESCRIPTION OF THE EMBODIMENT

A preferred embodiment of the present invention will be explained below in detail with reference to the accompanying drawings.

[First Embodiment]

Figure 1:
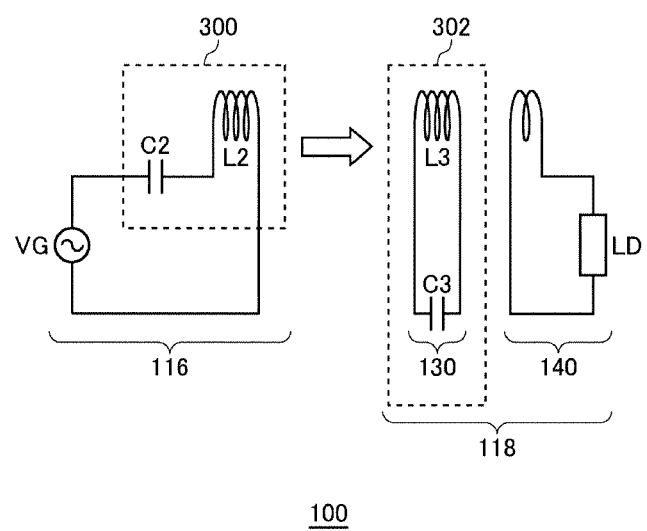
FIG. 1 is a principle view of a wireless power transmission system according to a first embodiment of the present invention.

FIG. 1 is a view illustrating operation principle of a wireless power transmission system 100 according to the first embodiment. The wireless power transmission system 100 in the first embodiment includes a wireless power feeder 116 and a wireless power receiver 118. The wireless power feeder 116 includes a power feeding LC resonance circuit 300. The wireless power receiver 118 includes a receiving coil circuit 130 and a loading circuit 140. A power receiving LC resonance circuit 302 is formed by the receiving coil circuit 130.

The power feeding LC resonance circuit 300 includes a capacitor C2 and a feeding coil L2. The power receiving LC resonance circuit 302 includes a capacitor C3 and a receiving coil L3. The values of the capacitor C2, feeding coil L2, capacitor C3, and receiving coil L3 are set such that the resonance frequencies of the feeding LC resonance circuit 300 and receiving LC resonance circuit 302 coincide with each other in a state where the feeding coil L2 and receiving coil L3 are disposed away from each other far enough to ignore the magnetic field coupling therebetween. This common resonance frequency is assumed to be fr0.

In a state where the feeding coil L2 and receiving coil L3 are brought close to each other in such a degree that they can be magnetic-field-coupled to each other, a new resonance circuit is formed by the power feeding LC resonance circuit 300, power receiving LC resonance circuit 302, and mutual inductance generated between them. The new resonance circuit has two resonance frequencies fr1 and fr2 (fr1<fr0<fr2) due to the influence of the mutual inductance. When the wireless power feeder 116 supplies AC power from a power feeding source VG to the power feeding LC resonance circuit 300 at the resonance frequency fr1, the power feeding LC resonance circuit 300 constituting apart of the new resonance circuit resonates at a resonance point 1 (resonance frequency fr1). When the power feeding LC resonance circuit 300 resonates, the feeding coil L2 generates an AC magnetic field of the resonance frequency fr1. The power receiving LC resonance circuit 302 constituting apart of the new resonance circuit also resonates by receiving the AC magnetic field. When the power feeding LC resonance circuit 300 and power receiving LC resonance circuit 302 resonate at the same resonance frequency fr1, wireless power feeding from the feeding coil L2 to receiving coil L3 is performed with the maximum power transmission efficiency. Received power is taken from a load LD of the wireless power receiver 118 as output power. Note that the new resonance circuit can resonate not only at the resonance point 1 (resonance frequency fr1) but also at a resonance point 2 (resonance frequency fr2).

The wireless power feeder 116 based on this principle does not include an exciting coil. In case of including the exciting coil L1, the principle of a wireless feeding is basically the same. It will be described later related with FIG. 10 and the like in case of not including the exciting coil L1.

Figure 2:
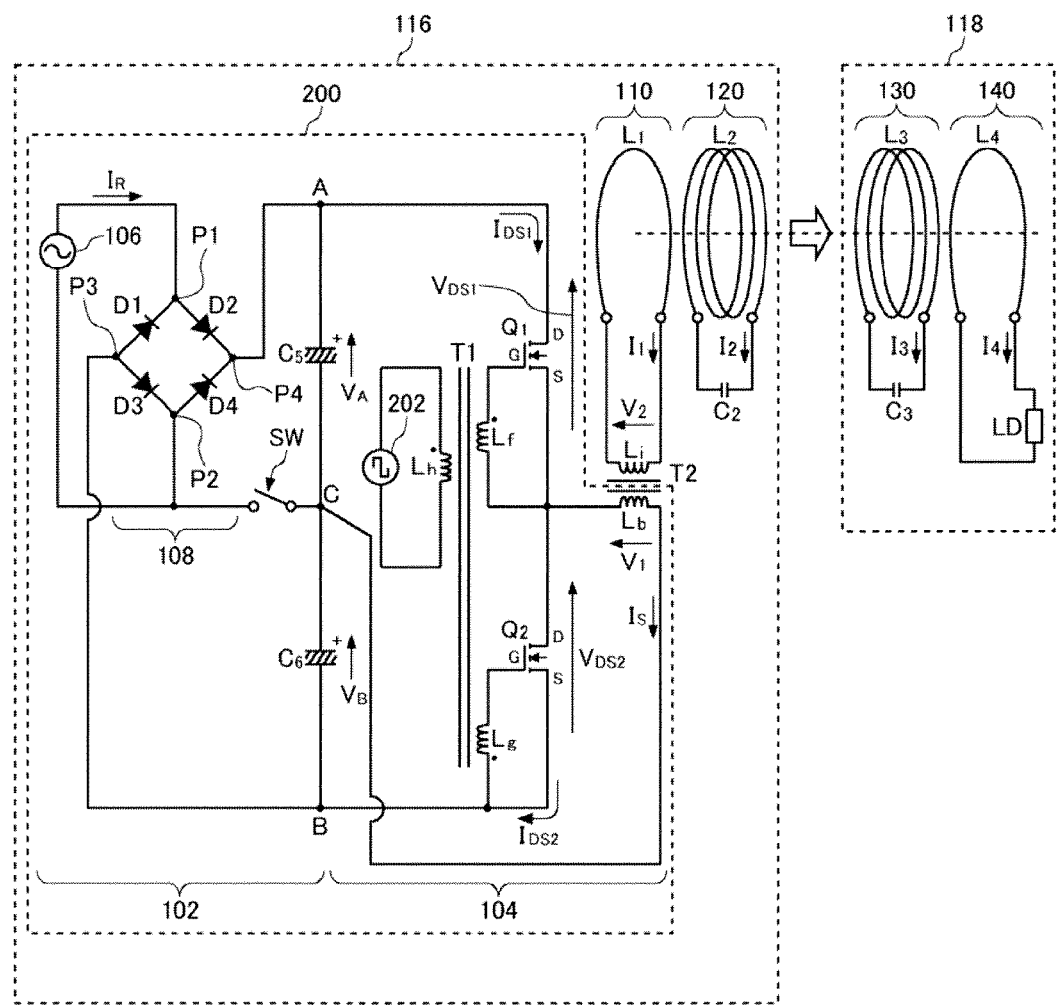
FIG. 2 is a configuration view of a wireless power transmission system according to a first embodiment of the present invention.

FIG. 2 is a system configuration view of a wireless power transmission system 100 according to the first embodiment. The wireless power transmission system 100 includes a wireless power feeder 116 and a wireless power receiver 118. The wireless power feeder 116 includes, as basic components, a power transmission control circuit 200, an exciting circuit 110, and a feeding coil circuit 120. The wireless power receiver 118 includes a receiving coil circuit 130, and a loading circuit 140.

A distance of several meters is provided between a feeding coil L2 of the feeding coil circuit 120 and a receiving coil L3 of the receiving coil circuit 130. The wireless power transmission system 100 mainly aims to feed AC power from the feeding coil L2 to receiving coil L3 by wireless. The wireless power transmission system according to the present embodiment is assumed to operate at a resonance frequency fr1 of 100 kHz or less. In the present embodiment, a resonance frequency fr1 is set to 50 kHz. Note that the wireless power transmission system according to the present embodiment can operate in a high-frequency band such as ISM (Industry-Science-Medical) frequency band.

In the exciting circuit 110, an exciting coil L1 and a transformer T2 secondary coil L1 are connected in series. The transformer T2 secondary coil L1 constitutes a coupling transformer T2 together with a transformer T2 primary coil Lb and receives AC power from the power transmission control circuit 200 by electromagnetic induction. The number of windings of the exciting coil L1 is 1, cross-sectional shape of a coil conductor thereof is a rectangle of 0.6 mm×6.0 mm, and shape of the exciting coil L1 itself is a square of 210 mm×210 mm. In FIG. 2, the exciting coil L1 is represented by a circle for simplicity. Other coils are also represented by circles for the same reason. All the coils illustrated in FIG. 2 are made of copper. Current I1 flowing in the exciting circuit 110 is AC. The direction of an arrow in the diagram of the exciting circuit 110 indicates the positive direction, and direction opposite to the direction of the arrow indicates the negative direction.

In the feeding coil circuit 120, a feeding coil L2 and a capacitor C2 are connected in series. The exciting coil L1 and feeding coil L2 face each other. The distance between the exciting coil L1 and feeding coil L2 is as comparatively small as 10 mm or less. Thus, the exciting coil L1 and feeding coil L2 are electromagnetically strongly coupled to each other. The number of windings of the feeding coil L2 is 7, cross-sectional shape of a coil conductor thereof is a rectangle of 0.6 mm×6.0 mm, and shape of the feeding coil L2 itself is a square of 280 mm×280 mm. When the AC current I1 is made to flow in the exciting coil L1, an electromotive force occurs in the feeding coil L2 according to the principle of electromagnetic induction to cause AC current I2 to flow in the feeding coil circuit 120. The direction of an arrow in the diagram of the feeding coil circuit 120 indicates the positive direction, and direction opposite to the direction of the arrow indicates the negative direction. The flowing directions of the current I2 and current I1 are the same (in-phase). The AC current I2 is considerably larger than the AC current I1. The values of the feeding coil L2 and capacitor C2 are set such that the resonance frequency fr1 is 50 kHz.

In the receiving coil circuit 130, a receiving coil L3 and a capacitor C3 are connected in series. The feeding coil L2 and receiving coil L3 face each other. The distance between the feeding coil L2 and receiving coil L3 is as comparatively large as about 0.2 m to 1 m. The number of windings of the receiving coil L3 is 7, cross-sectional shape of a coil conductor thereof is a rectangle of 0.6 mm×6.0 mm, and shape of the receiving coil L3 itself is a square of 280 mm×280 mm. The values of the receiving coil L3 and capacitor C3 are set such that the resonance frequency fr1 is also 50 kHz. Thus, the feeding coil L2 and receiving coil L3 need not have the same shape. When the feeding coil L2 generates a magnetic field at the resonance frequency fr1, the feeding coil L2 and receiving coil L3 magnetically resonate, causing large current I3 to flow in the receiving coil circuit 130. The direction of an arrow in the diagram of the receiving coil circuit 130 indicates the positive direction, and direction opposite to the direction of the arrow indicates the negative direction. The flowing directions of the current I2 and current I3 are the same (in-phase).

In the loading circuit 140, a loading coil L4 and a load LD are connected in series. The receiving coil L3 and loading coil L4 face each other. The distance between the receiving coil L3 and loading coil L4 is as comparatively small as about 10 mm or less. Thus, the receiving coil L3 and loading coil L4 are electromagnetically strongly coupled to each other. The number of windings of the loading coil L4 is 1, cross-sectional shape of a coil conductor thereof is a rectangle of 0.6 mm×6.0 mm, and shape of the loading coil L4 itself is a square of 300 mm×300 mm. When the current I3 is made to flow in the receiving coil L3, an electromotive force occurs in the loading circuit 140 to cause current I4 to flow in the loading circuit 140. The direction of an arrow in the diagram of the loading circuit 140 indicates the positive direction, and direction opposite to the direction of the arrow indicates the negative direction. The flowing directions of the current I3 and current I4 are the same (in-phase). That is, the current I2 and current I4 are also in-phase. The AC power fed from the feeding coil L2 of the wireless power feeder 116 is received by the receiving coil L3 of the wireless power receiver 118 and taken from the load LD.

If the load LD is connected in series to the receiving coil circuit 130, the Q-value of the receiving coil circuit 130 is degraded. Therefore, the receiving coil circuit 130 for power reception and loading circuit 140 for power extraction are separated from each other. In order to enhance the power transmission efficiency, the center lines of the exciting coil L1, the feeding coil L2, receiving coil L3, and loading coil L4 are preferably made to coincide with one another.

A configuration of the power transmission control circuit 200 will be described. The power transmission control circuit 200 is a half-bridge type electric circuit and roughly includes a power supply section 102 and a control section 104. In the power supply section 102, a capacitor C5 is connected between points A and C of FIG. 2, and a capacitor C6 is connected between points C and B of FIG. 2. These capacitors are charged by the voltage of an AC power supply 106. The voltage (voltage between points A and C) of the capacitor C5 is referred to as VA, voltage (voltage between points C and B) of the capacitor C6 is referred to as VB, and VA+VB (voltage between points A and B) is referred to as input voltage Vin.

The AC power supply 106 is a usual commercial power supply. The AC voltage of the AC power supply 106 is rectified by a rectification circuit 108 to be converted into DC voltage. The rectification circuit 108 is a circuit in which four diodes D1 to D4 are bridge-connected to one another. One end of the AC power supply 106 is connected to a connection point P1 between the diodes D1 and D2, and the other end thereof is connected to a connection point P2 between the diodes D3 and D4. A connection point P3 between the diodes D1 and D3 is connected to point B, a negative-side of the capacitor C6, and a connection point P4 between the diodes D2 and D4 is connected to point A, a positive-side of the capacitor C5. The connection point P2 is connected a point C through a switch SW. As a modification, in place of the connection point P2, connection point P1 may be connected to the point C.

Current flowing from the AC power supply 106 is referred to as "current IR". The current IR is AC current. The direction of an arrow in the diagram of the power supply section 102 indicates the positive direction, and direction opposite to the direction of the arrow indicates the negative direction.

When the switch SW is turned ON, electrical conduction is made between the negative electrode of the capacitor C5 and connection point P2 and between the positive electrode of the capacitor C6 and connection point P2. When flowing in the positive direction, the current IR flows from the AC power supply 106, passes through the connection point P1, diode D2, connection point P4, point A, capacitor C5, point C, and switch SW in this order, and returns to the AC power supply 106. When flowing in the negative direction, the current IR flows from the AC power supply 106, passes through the switch SW, point C, capacitor C6, point B, connection point P3, diode D1, and connection point P1 in this order, and returns to the AC power supply 106. Direction of the current IR changes at the frequency of the AC power supply 106, for example, 50 kHz.

As described above, when the switch SW is turned ON, the positive voltage of the AC power supply 106 is applied only to the capacitor C5, and negative voltage thereof is applied only to the capacitor C6. For example, when the effective voltage of the AC power supply 106 is 100 (V), about 141 (V) which is the maximum voltage value is applied to the capacitors C5 and C6, respectively. As a result, input voltage Vin becomes 282 (V) (=141+141). That is, the capacitors C5 and C6 each become a DC power supply of 141 (V).

When the switch SW is turned OFF, the path of the current IR is changed. When flowing in the positive direction, the current IR flows from the AC power supply 106, passes through the connection point P1, diode D2, connection point P4, point A, capacitor C5, point C, capacitor C6, point B, connection point P3, diode D3 and connection point P2 in this order, and returns to the AC power supply 106. When flowing in the negative direction, the current IR flows from the AC power supply 106, passes through the connection point P2, diode D4, connection point P4, point A, capacitor C5, point C, capacitor C6, point B, connection point P3, diode D1, and connection point P1, and returns to the AC power supply 106.

As described above, when the switch SW is turned OFF, both the positive and negative voltages of the AC power supply 106 are applied between points A and B. For example, the effective voltage of the AC power supply 106 is 200 (V), about 282 (V) which is the maximum voltage value is applied to a series circuit of the capacitors C5 and C6. That is, the input voltage Vin becomes 282 (V). The capacitors C5 and C6 each become a DC power supply of 141 (V).

Irrespective of whether the effective voltage of the AC power supply 106 is 100 (V) or 200 (V), the input voltage Vin can be kept at 284 (V) by controlling the switch SW. However, it is not always possible to keep the input voltage Vin at a fixed value by controlling ON/OFF of the switch SW. For example, when the effective voltage of the AC power supply 106 is 100 (V) and 120 (V), the input voltage Vin becomes different values. Even in this case, by adjusting the ratio of the number of windings of the coupling transformer T2 as described later, the magnitude of the voltage to be fed to the exciting circuit 110 can arbitrarily be set.

As illustrated in FIG. 2, the control section 104 has an electric circuit having a vertically symmetrical shape. In the control section 104, an oscillator 202 is connected to the primary side of a gate-drive transformer T1. The oscillator 202 generates AC voltage Vo of a drive frequency fo. Although the waveform of the AC voltage Vo may be a sine wave, it is assumed here that the voltage waveform is a rectangular wave. The drive frequency fo is generally 50 kHz which is equal to the resonance frequency fr1 and significantly higher than the frequency of the AC power supply 106. The voltage of the oscillator 202 is generally significantly lower than the voltage of the AC power supply 106.

The AC voltage Vo causes current of the drive frequency fo to flow in a transformer T1 primary coil Lh alternately in both positive and negative directions. The transformer T1 primary coil Lh, transformer T1 secondary coil Lf, and transformer T1 secondary coil Lg constitute a gate-drive coupling transformer T1. Electromagnetic induction causes current to flow also in the transformer T1 secondary coil Lf and the transformer T1 secondary coil Lg alternately in both positive and negative directions.

One end of the transformer T1 secondary coil Lf is connected to the gate of a switching transistor Q1, and the other end of the transformer T1 secondary coil Lf is connected to the source of a switching transistor Q1. One end of the transformer T1 secondary coil Lg is connected to the gate of a switching transistor Q2, and the other end of the transformer T1 secondary coil Lg is connected to the source of a switching transistor Q2. When the oscillator 202 generates AC voltage Vo of the drive frequency fo, voltage Vx (Vx>0) of the drive frequency fo is applied alternately to the gates of the switching transistors Q1 and Q2. As a result, the switching transistors Q1 and Q2 are alternately turned on/off at the drive frequency fo. The switching transistors Q1 and Q2 are enhancement type MOSFET (Metal Oxide Semiconductor Field effect transistor) having the same characteristics but may be other transistors such as a bipolar transistor. Further, other switches such as a relay switch may be used in place of the transistor.

The drain of the switching transistor Q1 is connected to the positive electrode of the capacitor C5. The negative electrode of the capacitor C5 is connected to the source of the switching transistor Q1 through the transformer T2 primary coil Lb. The potential of the negative electrode of the capacitor C5 is assumed to be ground potential. The source of the switching transistor Q2 is connected to the negative electrode of the capacitor C6. The positive electrode of the capacitor C6 is connected to the drain of the switching transistor Q2 through the transformer T2 primary coil Lb. The potential of the positive electrode of the capacitor C6 is ground potential.

Voltage between the source and drain of the switching transistor Q1 is referred to as source-drain voltage VDS1, and voltage between the source and drain of the switching transistor Q2 is referred to as source-drain voltage VDS2. Current flowing between the source and drain of the switching transistor Q1 is referred to as source-drain current IDS1, and current flowing between the source and drain of the switching transistor Q2 is referred to as source-drain current IDS2. The directions of arrows in the diagram indicate the positive directions, and directions opposite to the directions of the arrows indicate the negative directions.

When the switching transistor Q1 is turned conductive (ON), the switching transistor Q2 is turned non-conductive (OFF). A main current path (hereinafter, referred to as "first current path") at this time extends from the positive electrode of the capacitor C5, passes through the point A, switching transistor Q1, transformer T2 primary coil Lb, and point C in this order, and returns to the negative electrode of the capacitor C5. The switching transistor Q1 functions as a switch for controlling conduction/non-conduction of the first current path.

When the switching transistor Q2 is turned conductive (ON), the switching transistor Q1 is turned non-conductive (OFF). A main current path (hereinafter, referred to as "second current path") at this time extends from the positive electrode of the capacitor C6, passes through the point C, transformer T2 primary coil Lb, switching transistor Q2, and point B in this order, and returns to the negative electrode of the capacitor C6. The switching transistor Q2 functions as a switch for controlling conduction/non-conduction of the second current path.

Current flowing in the transformer T2 primary coil Lb in the power transmission control circuit 200 is referred to as "current IS". The current IS is AC current, and the current flow in the first current path is defined as the positive direction and current flow in the second current path is defined as the negative direction.

When the oscillator 202 feeds the AC voltage Vo at the drive frequency fo equal to the resonance frequency fr1, the first current path and second current path are alternately switched at the resonance frequency fr1. Since the AC current IS of the resonance frequency fr1 flows in the transformer T2 primary coil Lb, the AC current I1 flows in the exciting circuit 110 at the resonance frequency fr1, and the AC current I2 of the resonance frequency fr1 flows in the feeding coil circuit 120. Thus, the feeding coil L2 of the feeding coil circuit 120 and capacitor C2 are in a resonance state. The receiving coil circuit 130 is also a resonance circuit of the resonance frequency fr1, so that the feeding coil L2 and receiving coil L3 magnetically resonate. At this time, the maximum transmission efficiency can be obtained.

In the first current path, the capacitor C5 functions as a DC voltage source. Assuming that the both-end voltage of the transformer T2 primary coil Lb is V1, voltage VA (=Vin/2) of the capacitor C5 is equal to VDS1+V1. The transformer T2 primary coil Lb need not LC-resonate with another capacitor, so that a large value can be set as the inductance thereof. Thus, even in the case where the input voltage Vin is high, VDS1 becomes small when the inductance of the transformer T2 primary coil Lb is large enough, which prevents excessive voltage from being applied between the source and drain of the switching transistor Q1.

In the second current path, the capacitor C6 functions as a DC voltage source. The voltage VB of the capacitor C6 is equal to VDS2+V1. Also in this case, when the inductance of the transformer T2 primary coil Lb is large enough, the switching transistor Q2 is hardly destroyed.

That is, although the input voltage Vin becomes high when the power supply voltage of the AC power supply 106 is high, most of the input voltage Vin is applied to the transformer T2 primary coil Lb, thereby preventing excessive voltage from being applied to the switching transistors Q1 and Q2. This is because that it is not necessary to make the transformer T2 primary coil Lb LC-resonate in the power transmission control circuit 200.

Assume that the number of windings of the transformer T2 primary coil Lb is N1 and number of windings of the transformer T2 secondary coil Li is N2. The AC magnetic field generated by the AC current IS of the transformer T2 primary coil Lb causes inductive current I1 having the same phase as that of the AC current IS to flow in the transformer T2 secondary coil Li. The coupling transformer T2 is, e.g., a small transformer (toroidal, EE-type, EI-type, etc.) using a ferrite core. The magnitude of the current I1 is IS·(N1/N2) according to the law of equal ampere-turn. The relationship between the voltage V2 of the transformer T2 secondary coil Li and voltage V1 of the transformer T2 primary coil Lb is represented by V2=V1·(N2/N1). In the present embodiment, N1>N2 is established. Therefore, the voltage V1 is reduced to voltage V2 by the coupling transformer T2. By adjusting the ratio between N1 and N2, the magnitude of the voltage V2 to be fed to the exciting circuit 110 can arbitrarily be set. As described above, the difference of the effective voltage of the AC power supply 106 can be adjusted by ON/OFF of the switch SW and adjustment of the ratio between N1 and N2.

Figure 3:
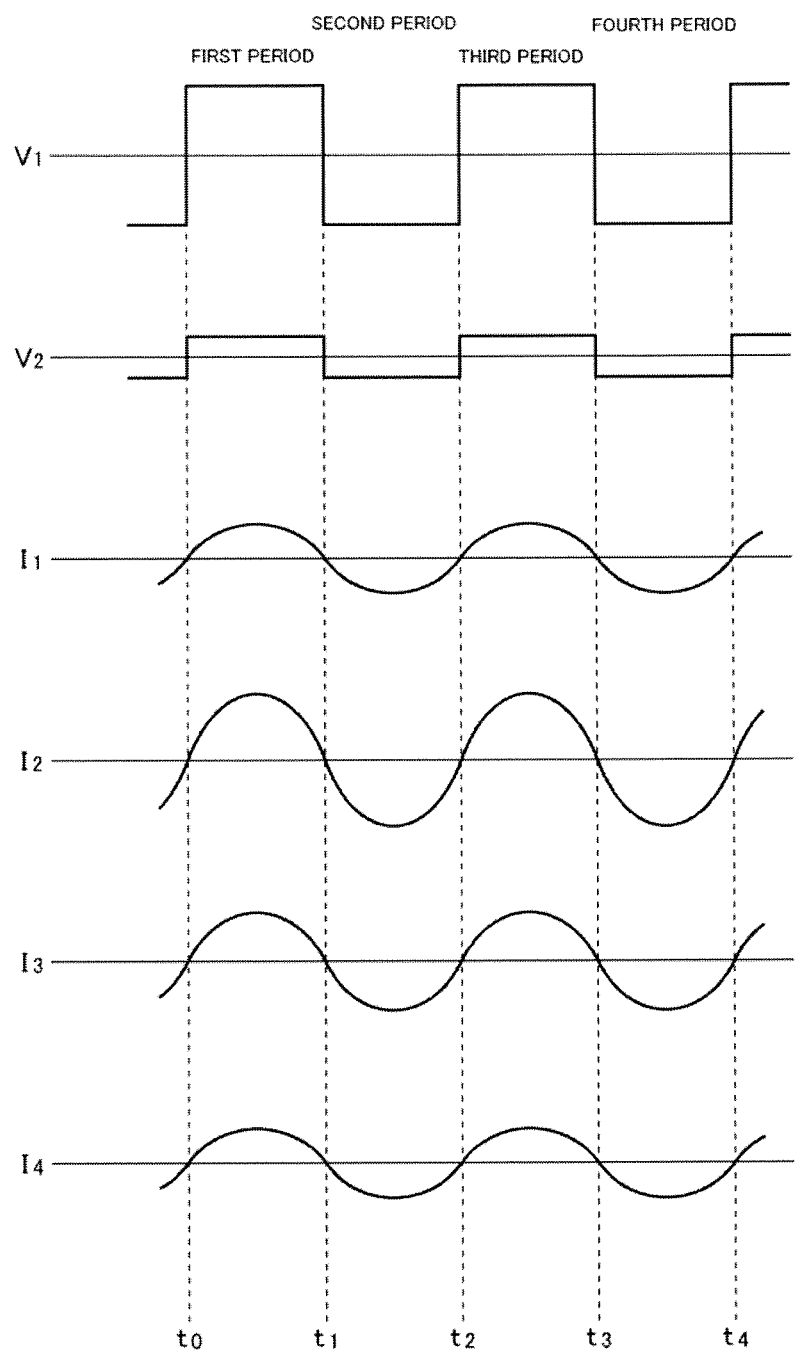
FIG. 3 is a time chart illustrating the voltage/current changing process.

FIG. 3 is a time chart illustrating the voltage/current changing process. Time period from time t0 to time t1 (hereinafter, referred to as "first time period") is a time period during which the switching transistor Q1 is ON while the switching transistor Q2 is OFF. Time period from time t1 to time t2 (hereinafter, referred to as "second time period") is a time period during which the switching transistor Q1 is OFF while the switching transistor Q2 is ON. Time period from time t2 to time t3 (hereinafter, referred to as "third time period") is a time period during which the switching transistor Q1 is ON while the switching transistor Q2 is OFF. Time period from time t3 to time t4 (hereinafter, referred to as "fourth time period") is a time period during which the switching transistor Q1 is OFF while the switching transistor Q2 is ON.

When the gate-source voltage VGS1 of the switching transistor Q1 exceeds a predetermined threshold, the switching transistor Q1 is in a saturated state. Thus, when the switching transistor Q1 is turned ON (conductive) at time t0 which is the start timing of the first time period, the source-drain current IDS1 starts flowing. In other words, the current IS starts flowing in the positive direction (the first current path). At this time, positive direction voltage V1 is applied to both ends of the transformer T2 primary coil Lb. Further, positive direction voltage V2 is applied to both ends of the transformer T2 secondary coil Li Since N1>N2, V1>V2 is established.

Currents having the same phase start flowing in the exciting circuit 110, feeding coil circuit 120, receiving coil circuit 130, and loading circuit 140.

When the switching transistor Q1 is turned OFF (non-conductive) at time t1 which is the start timing of the second time period, the source-drain current IDS1 does not flow. On the other hand, the switching transistor Q2 is turned ON (conductive), the source-drain current IDS2 starts flowing. That is, the current IS starts flowing in the negative direction (the second current path). At this time, negative direction voltage V1 is applied to both ends of the transformer T2 primary coil Lb. Further, negative direction voltage V2 is applied to both ends of the transformer T2 secondary coil Li. After the third and fourth time periods, the same waveform as in the first and second time periods repeats.

Figure 4:
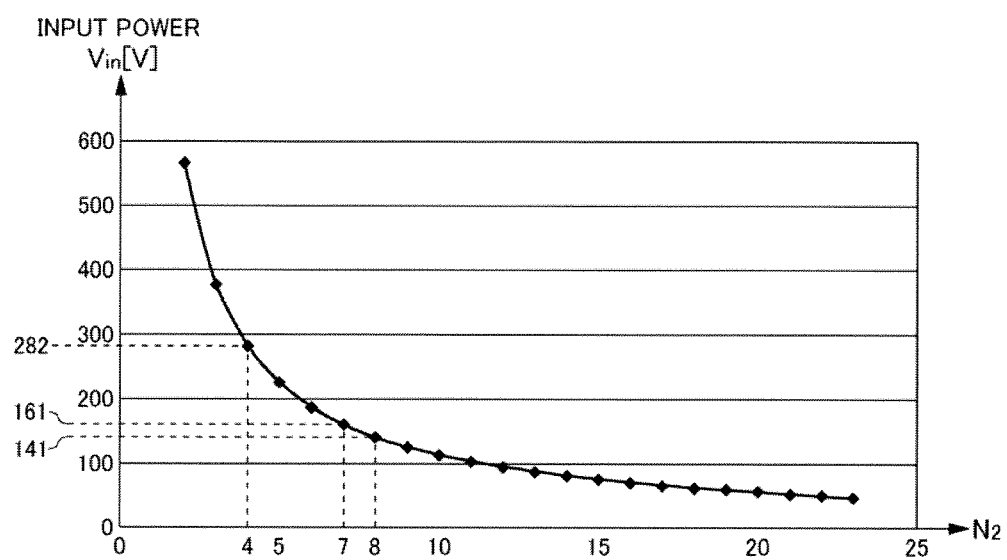
FIG. 4 is a graph illustrating a relationship between the number of windings of the secondary coil in the coupling transformer T2 and secondary voltage.

FIG. 4 is a graph illustrating a relationship between the number of windings of the secondary coil in the coupling transformer T2 and secondary voltage V2. The vertical axis represents input voltage Vin (V), and horizontal axis represents the number N2 of windings of the transformer T2 secondary coil Li. The graph of FIG. 4 is drawn assuming a case where AC power of 20 (W) is fed by wireless. Further, the number N1 of windings of the transformer T2 primary coil Lb is assumed to be 23.

When the input voltage Vin is 282 (V), N2 is 4. As described above, when the switch SW is turned ON at the time when the effective voltage of the AC power supply 106 is 100 (V), the input voltage Vin is 282 (V). In this case, by setting N2 to 4, AC power of 20 (W) can be fed. When the effective voltage of the AC power supply 106 is 200 (V), the switch SW is turned OFF and N2 is set to 4.

When the input voltage Vin is 141 (V), N2 is 8. When the switch SW is turned OFF at the time when the effective voltage of the AC power supply 106 is 100 (V) and N2 is set to 8, AC power of 20 (W) can be fed. When the input voltage Vin is 161 (V), N2 is set to 7.

Figure 5:
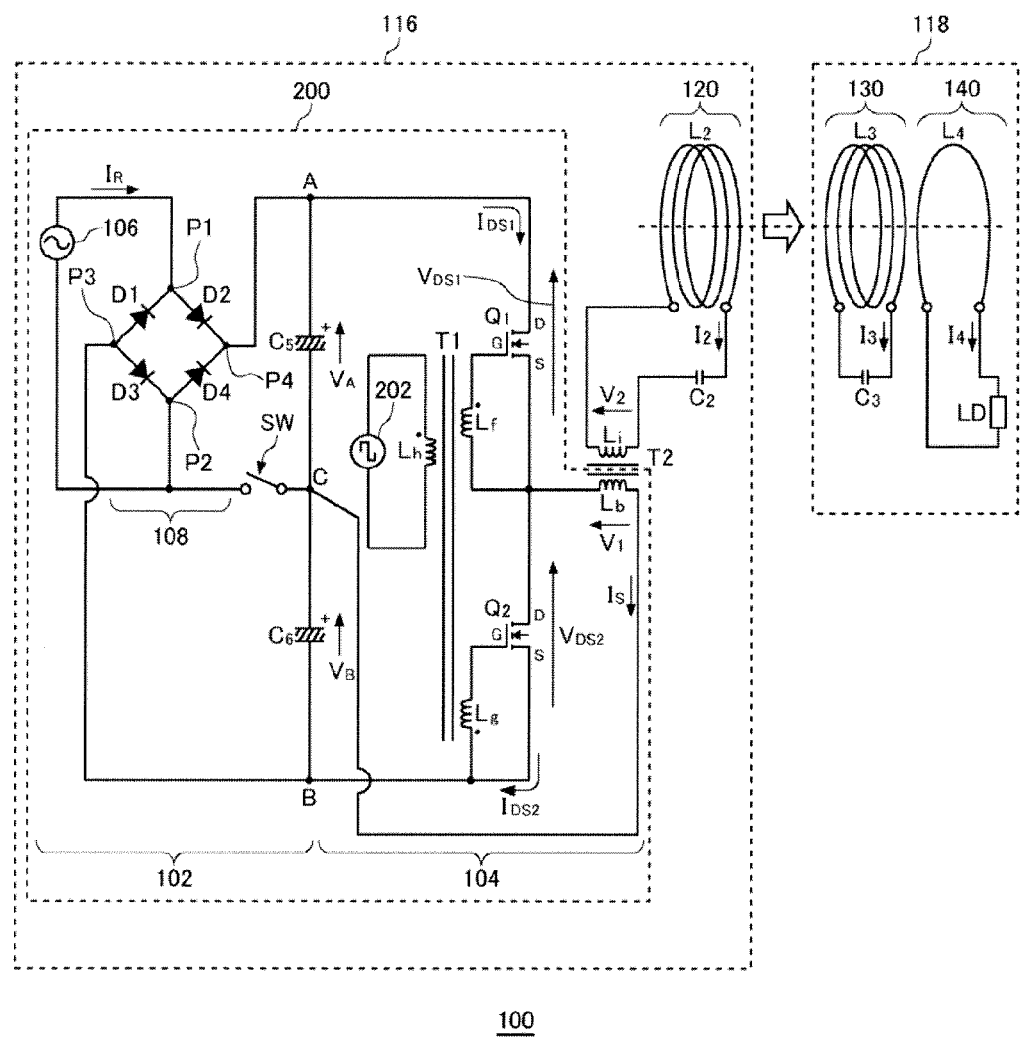
FIG. 5 is configuration view of a modification of the wireless power transmission system.

FIG. 5 is a system configuration view of a wireless power transmission system 100 which is a modification of the present embodiment. In the wireless power transmission system 100 of the modification, the power transmission control circuit 200 directly drives the feeding coil circuit 120 without intervention of the exciting circuit 110. Components designated by the same reference numerals as those of FIG. 2 have the same or corresponding functions as those in FIG. 2.

The feeding coil circuit 120 in the modification is a circuit in which the transformer T2 secondary coil Li is connected in series to the feeding coil L2 and capacitor C2. The transformer T2 secondary coil Li constitutes a coupling transformer T2 together with the transformer T2 primary coil Lb and receives AC power from the power transmission control circuit 200 by electromagnetic induction. Thus, the AC power may be directly fed from the power transmission control circuit 200 to the feeding coil circuit 120 without intervention of the exciting circuit 110.

[Second Embodiment]

Figure 6:
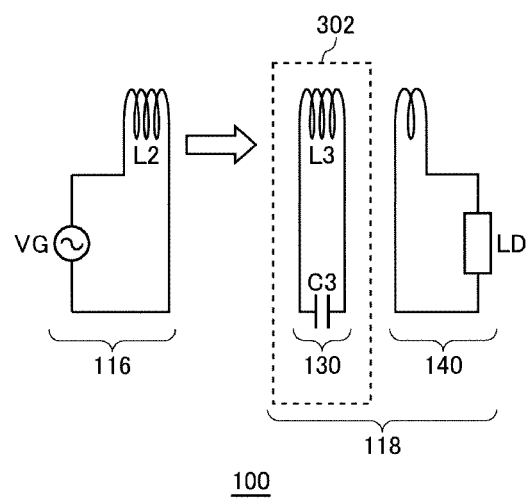
FIG. 6 is a principle view of a wireless power transmission system according to a second embodiment of the present invention.

FIG. 6 is a view illustrating operation principle of the wireless power transmission system 100 according to a second embodiment. As in the case of the first embodiment, the wireless power transmission system 100 according to the second embodiment includes the wireless power feeder 116 and wireless power receiver 118. However, although the wireless power receiver 118 includes the power receiving LC resonance circuit 302, the wireless power feeder 116 does not include the power feeding LC resonance circuit 300. That is, the power feeding coil L2 does not constitute a part of the LC resonance circuit. More specifically, the power feeding coil L2 does not form any resonance circuit with other circuit elements included in the wireless power feeder 116. No capacitor is connected in series or in parallel to the power feeding coil L2. Thus, the power feeding coil L2 does not resonate in a frequency at which power transmission is performed.

The power feeding source VG supplies AC current of the resonance frequency fr1 to the power feeding coil L2. The power feeding coil L2 does not resonate but generates an AC magnetic field of the resonance frequency fr1. The power receiving LC resonance circuit 302 resonates by receiving the AC magnetic field. As a result, large AC current flows in the power receiving LC resonance circuit 302. Studies conducted by the present inventor have revealed that formation of the LC resonance circuit is not essential in the wireless power feeder 116. The power feeding coil L2 does not constitute apart of the power feeding LC resonance circuit, so that the wireless power feeder 116 does not resonate at the resonance frequency fr1. It has been generally believed that, in the wireless power feeding of a magnetic field resonance type, making resonance circuits which are formed on both the power feeding side and power receiving side resonate at the same resonance frequency fr1 (=fr0) allows power feeding of large power. However, it is found that even in the case where the wireless power feeder 116 does not contain the power feeding LC resonance circuit 300, if the wireless power receiver 118 includes the power receiving LC resonance circuit 302, the wireless power feeding of a magnetic field resonance type can be achieved.

Even when the power feeding coil L2 and power receiving coil L3 are magnetic-field-coupled to each other, a new resonance circuit (new resonance circuit formed by coupling of resonance circuits) is not formed due to absence of the capacitor C2. In this case, the stronger the magnetic field coupling between the power feeding coil L2 and power receiving coil L3, the greater the influence exerted on the resonance frequency of the power receiving LC resonance circuit 302. By supplying AC current of this resonance frequency, that is, a frequency near the resonance frequency fr1 to the power feeding coil L2, the wireless power feeding of a magnetic field resonance type can be achieved. In this configuration, the capacitor C2 need not be provided, which is advantageous in terms of size and cost.

Figure 7:
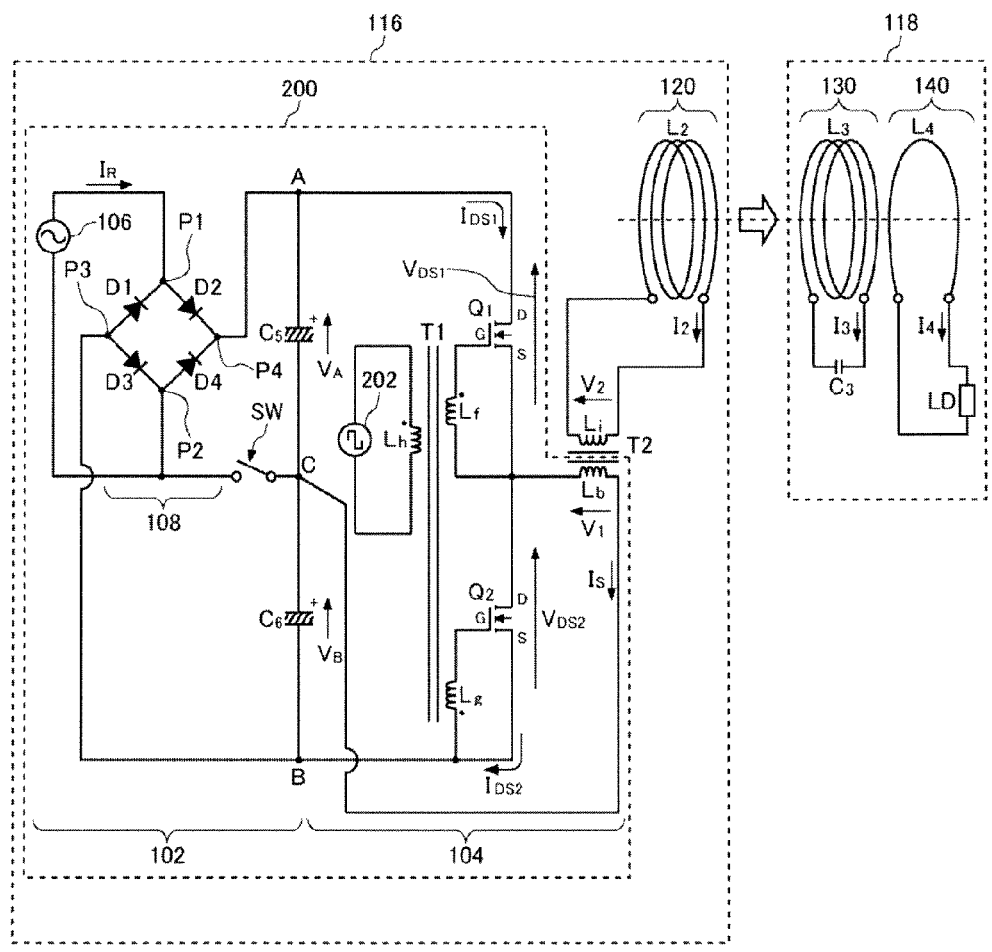
FIG. 7 is a system configuration view of a wireless power transmission system according to a second embodiment.

FIG. 7 is a system configuration view of the wireless power transmission system 100 according to the second embodiment. In the wireless power transmission system 100 of the second embodiment, the capacitor C2 is omitted. Other points are the same as the first embodiment.

The wireless power transmission system 100 has been described based on the preferred embodiment. Since only the transformer T2 primary coil Lb is connected in series to the switching transistor Q1 in the first current path, VA (=Vin/2) =VDS1+V1 is established. When V1 is sufficiently higher than VDS1, it is possible to prevent high voltage from being applied to the switching transistor Q1 even if the input voltage Vin is high. The same can be said for the second current path.

In the case of Patent Document 2, the primary coil L1 (corresponding to transformer T2 primary coil Lb) and capacitor C1 are made to resonate in series, so that the impedance of the series circuit part is reduced, which may result in application of high voltage to the MOSFET Q1 and the like. On the other hand, in the power transmission control circuit 200, it is not necessary to make the transformer T2 primary coil Lb resonate, so that the switching transistors Q1 and Q2 can easily be protected by the inductance of the transformer T2 primary coil Lb.

In the power transmission control circuit 200, the AC current IR of the AC power supply 106 is rectified by the rectification circuit 108, and the capacitors C5 and C6 are charged respectively. The charged capacitors C5 and C6 each function as a DC voltage source. Thus, while the capacitors C5 and C6 are charged by the AC power supply 106 in the power supply section 102, the AC current IS of the resonance frequency fr1 is generated by the oscillator 202 in the control section 104, whereby the AC power can be fed while utilizing the high voltage of the AC power supply 106. This eliminates need to use e.g., an AC adapter for reduction of the input voltage in the power supply section 102.

If an AC adapter or the like is provided in the power supply section 102, loss of AC adapter occurs. In the wireless power feeder 116 in the present embodiment, a commercial power supply can be utilized as the AC power supply 106 without modification, so that high power transmission efficiency can be achieved. Further, the input voltage Vin can be adjusted by means of the switch SW. Furthermore, it is possible to adjust voltage to be fed to the exciting circuit 110 by adjusting the ratio of the number of windings of the coupling transformer T2. Thus, a system configuration that conforms to various power supply voltages of the commercial power supply can be achieved.

The above embodiments are merely illustrative of the present invention and it will be appreciated by those skilled in the art that various modifications may be made to the components of the present invention and a combination of processing processes and that the modifications are included in the present invention.

The "AC power" used in the wireless power transmission system 100 may be transmitted not only as an energy but also as a signal. Even in the case where an analog signal or digital signal is fed by wireless, the wireless power transmission method of the present invention may be applied.

What is claimed is:

1. A wireless power feeder for feeding power from a feeding coil to a receiving coil by wireless using a magnetic field resonance phenomenon between the feeding coil and receiving coil, comprising:
a power transmission control circuit that includes first and second current paths and makes first and second switches connected in series respectively to the first and second current paths alternately conductive to feed AC power to a first coil included in both the first and second current paths;
the feeding coil; and
an exciting circuit in which a second coil magnetically coupled to the first coil and an exciting coil magnetically coupled to the feeding coil are connected, wherein
the exciting circuit receives AC power from the power transmission control circuit through the second coil and feeds the AC power to the feeding coil through the exciting coil.

2. A wireless power feeder for feeding power from a feeding coil to a receiving coil by wireless using a magnetic field resonance phenomenon between the feeding coil and receiving coil, comprising:
a power transmission control circuit that includes first and second current paths and makes first and second switches connected in series respectively to the first and second current paths alternately conductive to feed AC power to a first coil included in both the first and second current paths; and
a feeding coil circuit in which the feeding coil and a second coil are connected, wherein
the feeding coil circuit receives AC power from the power transmission control circuit through the second coil magnetically coupled to the first coil.

3. The wireless power feeder according to claim 2, wherein the power transmission control circuit includes:
a bridge rectification circuit in which diodes are bridge-connected at four first to fourth connection points;
an AC power supply connected between the first and second connection points of the bridge rectification circuit; and
a capacitor connected between the third and fourth connection points of the bridge rectification circuit and charged by the AC power supply, wherein
the power transmission control circuit feeds AC power to the first coil using the capacitor as a DC voltage source.

4. The wireless power feeder according to claim 3, wherein two capacitors are connected in series between the third and fourth connection points, and the midpoint of the capacitors is connected to one of the first and second connection points.

5. The wireless power feeder according to claim 4, comprising a switch for controlling electrical conduction of a path extending from the midpoint to one of the first and second connection points.

6. The wireless power feeder according to claim 2, wherein the number of windings of the first coil is greater than that of the second coil.

7. The wireless power feeder according to claim 2, wherein input voltage of the power transmission control circuit is applied to one of a series circuit composed of the first coil and the first switch and a series circuit composed of the first coil and the second switch.

8. The wireless power feeder according to claim 2, wherein the power transmission control circuit makes the feeding coil that does not substantially resonate with circuit elements on the power feeding side feed the AC power to the receiving coil.

9. The wireless power feeder according to claim 2, wherein the power feeding coil does not form, together with the circuit elements on the power feeding side, a resonance circuit having a resonance point corresponding to the resonance frequency of the receiving coil.

10. The wireless power feeder according to claim 2, wherein no capacitor is inserted in series or in parallel to the power feeding coil.

11. The wireless power feeder according to claim 2, wherein the feeding coil is connected to a capacitor and form a circuit which resonates at a resonance frequency of the receiving coil.

12. A wireless power transmission system comprising:
a wireless power feeder as claimed in claim 2;
the receiving coil; and
a loading coil magnetically coupled to the receiving coil and receives power that the receiving coil has received from the feeding coil.

13. The wireless power transmission system according to claim 12, wherein the receiving coil is connected to a capacitor and form a circuit which resonates at a resonance frequency of the feeding coil circuit.

* * * * *